United States Patent Office 3,325,298
Patented June 13, 1967

3,325,298
INCREASING THE MELTING RATE OF GLASS BATCH
Chester J. Brown, Jr., Toledo, Ohio, assignor to Libbey-Owens-Ford Glass Company, Toledo, Ohio, a corporation of Ohio
No Drawing. Filed Nov. 23, 1962, Ser. No. 239,781
3 Claims. (Cl. 106—52)

The present invention relates broadly to the mixing of glass batch materials and the feeding of such materials into a continuous melting tank for making sheet or plate glass. More particularly, it pertains to processes for densifying and removing entrapped air from glass batch compounded at least in part from extremely finely divided granular materials in order to increase the melting rate of the glass batch.

Sheet glass and plate glass are generally made by charging into one end of a continuous melting tank containing a mass of molten glass, a glass batch comprised primarily of sand, lime and soda ash, along with lesser amounts of other ingredients to impart various desired characteristics to the finished glass. Predetermined amounts of cullet, or broken glass, are also charged into the furnace along with the batch materials, either intimately admixed therewith or separately as in a layer or blanket upon which the batch materials are floated for movement into the melting area of the tank. The cullet and batch materials are melted and integrated into the molten mass and thereafter flow successfully through refinishing and conditioning or cooling areas into a working area where a sheet or plate is continuously drawn or rolled therefrom.

In the production of plate glass, the relatively viscous molten glass is withdrawn from the working end of the melting tank between a pair of counter-rotating forming rolls which reduce the glass to a continuous rough blank or ribbon of predetermined width and thickness. Due to the nature of its manufacture, the sheet or ribbon has relatively rough or irregular surfaces. In order to smooth these rough or irregular surfaces, as well as to provide parallelism therebetween, the sheet is subjected to a surfacing or grinding operation with an abrasive material such as ordinary sand. The abrasive material is usually fed onto the glass sheet as a slurry where it is utilized by a series of grinding runners, generally of cast iron, as a grinding medium to wear away irregularities in the surface of the sheet.

During the course of the grinding operation, the sand particles are gradually worn down and as they are thus worn down, the particles are reclassified and used at subsequent stages in the grinding process where the sheet approaches its final smoothness until such time as they become so small as to be no longer effective in grinding. In the past, this spent grinding slurry, which also contains extremely fine particles of glass eroded from the sheet and fragments of iron abraded from the grinding runners, has been discarded as being of no value and, in fact, disposal of the material has constituted a major problem due to the large quantities involved.

It has long been the dream of the flat glass industry to use this spent grinding sand, as well as the particles of glass eroded from the sheet, as constituents in the batch for making additional glass. However, several obstacles have heretofore prevented the utilization of the waste sand and glass particles for this purpose. Thus, due to the extremely small size of the particles, their recovery from the slurry in the usable form has not in the past been economically feasible. Recent developments, however, have included processes, as disclosed in copending application Ser. No. 196,203, filed on May 21, 1962, and now U.S. Patent 3,257,081, for recovering the waste products at a cost not inconsistent with their use as a glass batch constituent.

Theoretically, glass batch compounded from materials of an extremely small particle size should melt at a much faster rate than conventional glass batch due to the greater surface area of the individual particles, which enables the particles to both absorb heat and react with the fluxes at a faster rate. Thus, the productive capacity of any given melting furnace should be increased substantially by using a batch compounded from fine materials. However, it has been found that the melting capacity does not increase to the extent expected when such materials are merely substituted for conventional materials in the normal batch mixing and feeding process. Glass batch compounded from such fine materials tends to bulk and is relatively light and fluffy due to its large surface area, and the lack of the expected increase in the melting rate is believed to be caused by air entrapped within the batch which acts as an insulating medium in preventing heat from reaching the interior of the batch blanket or floating island of batch within the melting chamber of the furnace.

It is therefore an object of the present invention to provide a process for removing air entrapped in glass batch to thereby increase its thermal conductivity.

Another object of the invention is to provide a process whereby the bulk density of intermixed glass batch materials compounded at least in part from very fine granular materials may be increased.

Still another object of the invention is to increase the melting rate of glass batch materials compounded at least in part from very fine ingredients by removing air entrapped in the glass batch and increasing the bulk density thereof.

Other objects and advantages of the invention will become more apparent during the course of the following description.

Although the present invention is particularly well adapted to the utilization of waste materials resulting from the grinding of plate glass, it is to be understood that it is equally applicable to use with fine batch materials from any source, and even with conventional glass batch materials. Thus, it is contemplated that the melting rate of conventional, relatively coarse glass batch materials may likewise be increased by removing entrapped air therefrom according to the present invention. Of course, the fine materials from which the batch is compounded according to the preferred form of the invention, may also be obtained by pulverizing conventional batch sand or from naturally occurring deposits of fine sand instead of as a waste product of plate glass grinding as previously outlined.

The average ultimate particle size of the recovered material is in the neighborhood of about five microns, with many particles being two microns or less in size, although the particles may tend to agglomerate during recovery thereby necessitating that they be pulverized in order to take full advantage of their increased melting rate. As disclosed in the copending application, this recovered material includes both sand and glass particles, the metallic material abraded from the grinding runners being removed during the recovery process where the materials are to be used as glass batch constituents. The glass particles act as a source of cullet or scrap glass in the batch, and their presence is compensated for by reducing the amount of normal cullet added to the furnace along with the batch. It has been found that glass batch compounded from these recovered grinding materials has a density only about fifty-five to sixty percent as great as conventional glass batch. Thus, it will be apparent that the batch contains a large amount of entrapped aid which reduces its thermal conductivity and causes it to melt at a rate far below its potential, although under identical furnace conditions the fine batch and the conventional batch have been found to produce approximately the same amount of molten glass or, in other words, they melt at about the same rate on a weight basis.

According to the present invention, it has been found that at least part of this entrapped air can be removed from the batch prior to charging thereof into the furnace with a resultant increase in the melting rate of the glass making materials. In fact, the densified batch compounded from fine materials may melt as much as fifty percent or more faster than conventional batch.

As disclosed in the copending application, in recovering the waste grinding materials the suspended solids in the slurry are caused to settle at an accelerated rate and the settled solids and water are then separated. The solids are further dewatered to a predetermined constant moisture content, or else completely dried, to create the principal constituent for glass batch, the final dewatering generally being by the application of heat to the waste materials.

In preparing the glass making materials for charging into the furnace, thorough mixing to achieve a completely homogeneous mass is extremely important, as is the maintenance of this homogeneity until the materials are melted and integrated into the molten glass stream, if glass of high quality is to be consistently produced. Thus, predetermined amounts of each of the individual batch ingredients are accurately weighed and the materials are thoroughly intermixed. A certain amount of a liquid wetting medium such as water is also generally distributed through the intermixed materials to prevent their segregation during subsequent handling and charging into the furnace.

It is contemplated that densification or compaction of batch materials according to the present invention may occur either simultaneously with the mixing or subsequent thereto and prior to charging into the furnace. In any event, the batch must remain homogeneous after densification, that is, after removal of entrapped air. One suitable manner in which densification may be carried out is by mixing the materials within a conventional muller-type mixer wherein one or more sets of mullers are mounted within a mixing drum. In one such apparatus, each set of mullers includes a wheel rotatably mounted at either end of a horizontal shaft so as to roll along the floor of the mixing drum, with the horizontal shaft being mounted at its mid-point to rotate about a vertical axis in the direction opposite to the drum. In operation, the batch materials are simultaneously intermixed and kneaded or compacted against the floor of the mixing drum by the mullers, which may either take the place of the usual mixing elements or operate in conjunction therewith.

Conventional glass batch generally requires from about three to five percent by weight of water to prevent segregation according to particle size during handling subsequent to mixing, while batch compounded from recovered waste grinding materials requires somewhat more water due to the relatively large surface area of the individual particles upon which some of the water is adsorbed. Thus, for control purposes the recovered sand and glass particles have generally been dried to a point somewhat below that necessary to provide water for all of the batch materials, usually to a moisture content of three or four percent, and sufficient water is then added during mixing to bring the total moisture up to the desired level. It has been found, however, that if drying or dewatering of the waste materials is stopped at an intermediate point of eight or ten percent moisture, the batch subsequently compounded from the recovered materials will be compacted to a greater extent by the action of the mullers than batch employing ingredients having a lower moisture content.

As previously described, where the waste materials are substantially dried by heating during the recovery process, although containing as much as ten percent or more moisture, they tend to agglomerate and the agglomerated material must be pulverized or crushed prior to mixing and charging the batch into the furnace in order to achieve a homogeneous batch exhibiting the desired fast melting characteristics. Less bulking has been found to occur and higher batch densification can be achieved if the recovered material is not pulverized to its ultimate particle size of two microns or less, but to an average size in the range from about ten to one hundred microns and preferably about twenty-five microns, with the final drying during the recovery process being halted at a moisture content in the range from about five to twenty percent. The batch compounded from the recovered material may then be compacted by the previously described mulling process or by one of the processes to be hereinafter described.

In order to achieve better mixing and to provide a continuous feed to the melting furnace, we preferably first thoroughly mix the batch ingredients in a large mixer in individual dual batches. Thereafter, the mixed ingredients are stored for continuous feeding to a smaller muller-mixer of the type described. The compacted materials are then continuously charged directly into the melting tank from the muller-mixer with a minimum amount of handling, to prevent air from again being entrapped in the compacted materials.

There are a number of ways in which the batch may be compacted to remove entrapped air following the mixing step and completely separate therefrom. Thus, it is contemplated that the mixed batch may be passed between a pair of counter-rotating rollers where it is compressed into a thin sheet and charged directly into the melting tank in sheet form. The mixed batch should contain a relatively high amount of moisture, on the order of five to ten percent, to prevent the sheet thus formed from crumbling excessively. Although the sheet tends to break up, the entrapped air is forced out and a large surface area is subjected to the intense heat in the furnace so that the sheet melts rapidly.

The entrapped air may also be removed by pelletizing or tableting the batch materials after they are thoroughly mixed. The pellets or tablets may be formed in conventional pelleting apparatus and are preferably comparable in size to ordinary aspirin or smaller in order to present a large surface area for rapid melting. Pllets in the form of thin wafers are particularly beneficial due to their relatively large surface area-to-volume ratio. Glass batch normally contains a certain amount of dolomite, and it has been found that certain types of dolomite, when compressed within the pellets, tend to decrepitate or explode upon being heated and cause the pellets to break down. Since the materials are highly compressed by pelleting, they may be fed into the melting tank in a comparatively thin blanket containing very little entrapped air and having a high thermal conductivity. As the pellets break down upon being heated, the individual particles thereof are able to absorb heat at an even faster rate due to their large exposed surface area, thereby increasing the melting rate of the batch.

The batch materials, after mixing, may also be put through an extrusion process wherein they are continuously extruded under extremely high pressures directly into the melting area of the furnace, preferably as fine filaments or threads. The entrapped air is thus forced out and the materials are densified to the point where the threads will flash melt, that is, the entire thread will melt almost immediately upon being subjected to the extremely high temperature of the melting chamber. We preferably extrude the filaments of batch materials longitudinally into the melting chamber along the sides or the end thereof onto a bed of cullet. The floating cullet supports the threads for the short time required for them to melt and be integrated into the molten mass. It has been found that extruded threads of batch material up to ⅛ inch in diameter or larger will flash melt when extruded into the melting tank in this manner.

It is also contemplated by the present invention that the batch materials may be subjected to a partial vacuum to remove entrained air therefrom. The vacuum process may be used by itself as, for example, where the materials are transported to the furnace upon a porous conveyor having a vacuum applied to the underside thereof, or in conjunction with one of the earlier described processes to increase the ease and efficiency of densification. Thus, the mixing pan may be partially evacuated while the batch materials are being compacted therein by the action of mulling wheels, or the materials may be subjected to vacuum while being pelletized, compressed into a thin sheet, or extruded as fine filaments or threads.

According to the present invention, there is provided a novel process for increasing the melting rate of glass batch materials by densifying the materials and removing entrapped air therefrom to increase their thermal conductivity, particularly such batch materials compounded from relatively fine ingredients. Consequently, waste products resulting from the grinding of plate glass may be economically employed as constituents in making glass. As a result of the use of raw materials heretofore considered of no value and the increased production capacity of existing tank furnaces, it will be apparent that a dual saving in the cost of producing glass is effected.

It is to be understood that the forms of the invention herewith described are to be taken as illustrative embodiments only of the same, and that various procedural changes may be resorted to without departing from the spirit of the invention.

I claim:

1. In a method of increasing the melting rate of glass batch compounded from a plurality of individual ingredients and utilizing as a constituent recovered waste materials resulting from the grinding of plate glass, the steps of thoroughly intermixing predetermined amounts of the individual ingredients to create a homogeneous batch, and mechanically compacting the batch while simultaneously subjecting said batch to a partial vacuum to remove entrapped air therefrom so as to densify said batch and increase its thermal conductivity.

2. In a method of increasing the melting rate of glass batch compounded from a plurality of individual ingredients and utilizing as a constituent thereof recovered waste materials resulting from the grinding of plate glass, said recovered materials containing at least five percent moisture by weight, the steps of thoroughly intermixing predetermined amounts of the individual ingredients to create a homogeneous batch, and simultaneously mechanically compressing the batch and subjecting said batch to a partial vacuum for removing entrapped air therefrom and for densifying said batch to increase its thermal conductivity, said batch being compressed into individual pellets having a relatively large surface area in proportion to their volume whereby the pellets are enabled to absorb heat at a rapid rate.

3. In a method of utilizing in glass batch waste materials recovered from the slurry used in the grinding of plate glass wherein said waste materials have an ultimate particle size of about five microns or less, the steps of dewatering said waste materials to a moisture content in the range from about five to twenty percent by weight whereby said waste materials tend to agglomerate, reducing said agglomerated waste materials to a particle size in the range from about twenty-five to one hundred microns, thoroughly intermixing predetermined amounts of said waste materials, with other glass batch constituents to form a homogeneous glass batch, and removing entrapped air from the batch and densifying said batch to increase its thermal conductivity by simultaneously mechanically compacting the batch and subjecting said batch to a partial vacuum.

References Cited

UNITED STATES PATENTS

| 2,220,750 | 11/1940 | Bair et al. | 106—52 |
| 2,366,473 | 1/1945 | Bair | 106—52 |
| 3,121,628 | 2/1964 | Loehrke | 65—18 |

FOREIGN PATENTS

| 151,339 | 9/1920 | Great Britain. |

HELEN M. McCARTHY, *Primary Examiner.*

TOBIAS E. LEVOW, *Examiner.*